US010527202B2

(12) United States Patent
Kanie et al.

(10) Patent No.: US 10,527,202 B2
(45) Date of Patent: Jan. 7, 2020

(54) ROUTING CLIP ASSEMBLY

(71) Applicant: Illinois Tool Works Inc., Glenview, IL (US)

(72) Inventors: Hideki Kanie, Aichi (JP); Eric J. Kato, Morton Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/741,532

(22) PCT Filed: Jun. 10, 2016

(86) PCT No.: PCT/US2016/036927
§ 371 (c)(1),
(2) Date: Jan. 3, 2018

(87) PCT Pub. No.: WO2017/014856
PCT Pub. Date: Jan. 26, 2017

(65) Prior Publication Data
US 2018/0187798 A1    Jul. 5, 2018

Related U.S. Application Data

(60) Provisional application No. 62/195,410, filed on Jul. 22, 2015.

(51) Int. Cl.
*F16L 3/10* (2006.01)
*F16L 3/13* (2006.01)
(Continued)

(52) U.S. Cl.
CPC ............ *F16L 3/13* (2013.01); *B60R 16/0215* (2013.01); *B60R 16/08* (2013.01); *F16L 3/223* (2013.01);
(Continued)

(58) Field of Classification Search
CPC ....... F16L 3/13; F16L 3/08; F16L 3/10; F16L 3/1008; F16L 3/1033; F16L 3/1041;
(Continued)

(56) References Cited

U.S. PATENT DOCUMENTS 3,032,603 A * 5/1962 Whitley ................. H01R 4/186
174/168
3,944,177 A * 3/1976 Yoda ......................... F16L 3/08
248/74.2
(Continued)

FOREIGN PATENT DOCUMENTS

GB          2158143      11/1985
WO    WO 2013/188473    12/2013

OTHER PUBLICATIONS

International Search Report and Written Opinion for PCT/US2016/036927.

*Primary Examiner* — Nkeisha Smith
(74) *Attorney, Agent, or Firm* — Quarles & Brady LLP

(57) ABSTRACT

A routing clip assembly is configured to securely retain a tubular component (308). The routing clip assembly includes a tube-constraining insert (300) including a support base (310) and opposed constraining arms (320) extending from a first surface (322) of the support base. A tube-constraining channel (324) is defined between the opposed constraining arms and the support base. The constraining arms are configured to axially and radially constrain the tubular component. The routing clip assembly may also include a tube retainer (302) defining an internal chamber (303). The tube-constraining insert (300) is configured to be positioned within the internal chamber (303).

19 Claims, 6 Drawing Sheets

(51) Int. Cl.
*B60R 16/02* (2006.01)
*F16L 3/223* (2006.01)
*F16L 55/035* (2006.01)
*B60R 16/08* (2006.01)
*F16L 3/08* (2006.01)

(52) U.S. Cl.
CPC .............. *F16L 55/035* (2013.01); *F16L 3/08* (2013.01); *F16L 3/10* (2013.01); *F16L 3/1041* (2013.01)

(58) Field of Classification Search
CPC ... F16L 3/12; F16L 3/237; F16L 3/223; F16L 55/035; B60R 16/0215; B60R 16/08
USPC ......... 248/548, 68.1, 73, 65, 67.7, 72, 74.1, 248/74.2, 74.3, 74.4
See application file for complete search history.

(56) References Cited

U.S. PATENT DOCUMENTS

| | | | | | |
|---|---|---|---|---|---|
| 4,295,618 | A | * | 10/1981 | Morota | F16L 3/237 248/73 |
| 4,614,321 | A | * | 9/1986 | Andre | F16B 5/0685 24/555 |
| 4,728,071 | A | * | 3/1988 | Salacuse | F16L 3/1203 248/316.5 |
| 4,961,554 | A | * | 10/1990 | Smowton | F16L 3/23 248/68.1 |
| 5,016,336 | A | * | 5/1991 | Barnett | F16L 3/23 248/74.2 |
| 5,257,768 | A | * | 11/1993 | Juenemann | F16L 55/035 248/604 |
| 5,271,587 | A | * | 12/1993 | Schaty | H02G 3/26 248/68.1 |
| 7,278,190 | B2 | * | 10/2007 | Fischer | F16L 3/13 24/530 |
| 7,387,282 | B2 | * | 6/2008 | Kovac | B60R 16/0215 248/55 |
| 7,600,725 | B2 | * | 10/2009 | Mizukoshi | F16L 3/127 24/16 PB |
| 7,770,850 | B2 | * | 8/2010 | Allmann | F16L 3/2235 248/65 |
| 8,668,174 | B2 | * | 3/2014 | Kato | F16L 3/222 24/339 |
| 8,910,912 | B2 | * | 12/2014 | Child | F16L 3/2235 248/73 |
| 8,967,556 | B2 | * | 3/2015 | Meyers | F16L 3/2235 248/60 |
| 9,109,617 | B2 | * | 8/2015 | Diep | F16L 3/1075 |
| 9,297,479 | B2 | * | 3/2016 | Kato | F16L 3/2235 |
| 9,416,896 | B1 | * | 8/2016 | Kato | F16L 3/222 |
| 2012/0318935 | A1 | * | 12/2012 | Benedetti | F16L 3/1075 248/74.1 |
| 2013/0240684 | A1 | * | 9/2013 | Meyers | F16L 3/2235 248/74.1 |
| 2015/0041600 | A1 | * | 2/2015 | Sampson | F16L 3/123 248/68.1 |

\* cited by examiner

ROUTING CLIP ASSEMBLY

RELATED APPLICATIONS

This application is a National Phase of International Application No. PCT/US2016/036927, filed Jun. 10, 2016, which relates to and claims priority benefits from U.S. Provisional Patent Application No. 62/195,410 entitled "Routing Clip Assembly," filed Jul. 22, 2015, both of which are hereby incorporated by reference in their entireties.

FIELD OF EMBODIMENTS OF THE DISCLOSURE

Embodiments of the present disclosure generally relate to routing clip or tube-retaining assemblies that are configured to securely connect conduits, tubes, pipes, and/or the like to a frame, panel, or the like, such as within an automobile.

BACKGROUND

Various fluid-conveying tubular components, such as conduits, pipes, and tubes, may be secured to surfaces, such as walls, ceilings or the like, through fastening assemblies. For example, a cylindrical tube may be secured to a wall through a fastening assembly having a tube channel that snapably, latchably, or otherwise secures around a portion of the tube. The fastening assembly itself may be secured to the wall through a stud that is received and retained by a stud retainer, for example, that may be integrally formed with the fastening assembly.

However, the channels within the fastening assembly are typically configured to retain tubes having a certain diameter. The channels may not be able to accommodate tubes having smaller or larger diameters. For example, a tube having a smaller outer diameter than the inner diameter of the channel may axially shift within the channel. Accordingly, the fastening assembly may be incapable of securely retaining the smaller diameter tube.

Conversely, a tube having a larger outer diameter than the inner diameter of the channel is typically unable to fit within the channel. As such, the fastening assembly may be incapable of even receiving the tube.

FIG. 1 illustrates a perspective top view of a conventional tube-retaining clip 10 retaining a tubular component 12 (such as a pipe, conduit, tube, or the like). The tube-retaining clip 10 includes a main body 14 defining a tube-retaining channel 16. The tubular component 12 is received and retained within the tube-retaining channel 16. As shown, the tubular component 12 is urged into a receiving channel of the routing clip assembly in the direction of arrow A (conversely, the pipe is extracted in the opposite direction denoted by arrow B). The routing clip assembly is configured to resist thrust forces in the direction of arrow C (which are parallel with a longitudinal axis 18 of the tubular component), and rotational forces in the directions of arc D (radial about the longitudinal axis 18).

In general, the more a tube-retaining clip is designed to resist thrust forces (such as denoted by arrow C), the less the retaining clip is able to resist rotational forces (such as denoted by arc D), and vice versa. Accordingly, typical tube-retaining clips are designed to provide a balance between such forces. Some known tube-retaining clips include a relatively large barb that resists rotational force of a tubular component, but consequently increase insertion and extraction forces of a tubular component with respect to the tube-retaining clip assemblies, thereby making insertion and extraction of the tubular component more difficult. Conversely, some known-tube-retaining clips include a smaller barb, which reduces insertion and extraction forces of a tubular component, but may not effectively resist rotational forces.

SUMMARY OF EMBODIMENTS OF THE DISCLOSURE

A need exists for a tube-retaining clip assembly that is able to effectively resist axial (for example, thrust) and radial (for example, rotational) forces exerted by, into, and/or on a tubular component coupled to the routing clip assembly. With that need in mind, certain embodiments of the present disclosure provide a routing clip assembly configured to securely retain a tubular component. The routing clip assembly includes a tube-constraining insert including a support base and opposed constraining arms extending from a first surface of the support base. A tube-constraining channel is defined between the opposed constraining arms and the support base. The constraining arms are configured to axially and radially constrain the tubular component.

In at least one embodiment, the routing clip assembly also includes a tube retainer defining an internal chamber. The tube-constraining insert is positioned within the internal chamber.

The tube-constraining insert may be temporarily connected to the tube retainer within the internal chamber by at least one flash connection. The flash connection(s) is configured to break when the tube-constraining insert is driven into a final position within the internal chamber.

The tube retainer may include a base and walls upstanding from the base. The internal chamber may be defined between the base and the walls. The walls are configured to squeeze the opposed constraining arms towards one another when the tube-constraining insert is driven from an initial position to a final position within the internal chamber.

The tube-constraining insert may include a protuberance extending from a second surface of the support base that is opposite from the first surface. The tube retainer may include an insert-locking channel formed through a base. The protuberance is configured to be received and retained by the insert-locking channel to lock the tube-constraining insert in position with respect to the tube retainer.

Support ribs may extend from the base on either side of the insert-locking channel. The support ribs are configured to guide the protuberance into the insert-locking channel.

The tube retainer may include one or more constraining prongs that are configured to abut into an outer surface of the tubular component opposite from the tube-constraining insert.

In at least one embodiment, each of the opposed constraining arms includes a free end having an expanded head. The expanded head includes a lateral ramp that is configured to slide over a portion of a wall of a tube retainer.

At least one of the opposed constraining arms may include an inwardly-directed barb extending from an interior surface. The barb is configured to dig into an outer surface of the tubular component.

Certain embodiments of the present disclosure provide a routing clip assembly configured to securely retain a plurality of tubular components. The routing clip assembly includes a plurality of tube-constraining inserts, and a plurality of tube retainers.

Figure 1:
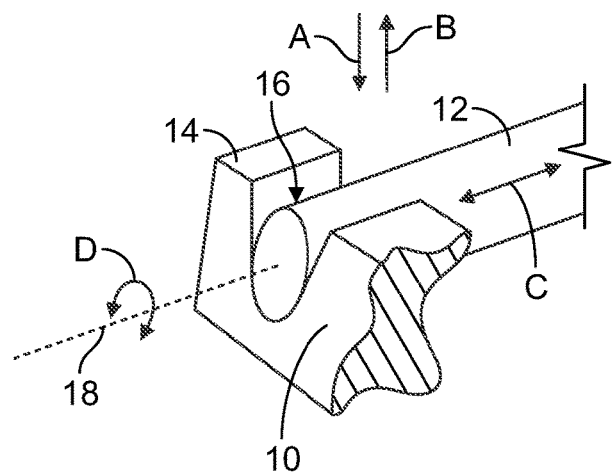
FIG. 1 illustrates a perspective top view of a conventional tube-retaining clip retaining a tubular component.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a routing clip assembly that is configured to effectively resist axial (for example, thrust) and radial (for example, rotational) forces exerted by, into, and/or on a tubular component coupled to the routing clip assembly. The routing clip assembly may be configured to accommodate tubular components of different diameters. The routing clip assembly may be used with respect to various applications, such as with respect to a vehicle, plumbing conduits (such as within walls of a structure), and/or the like.

Figure 2:
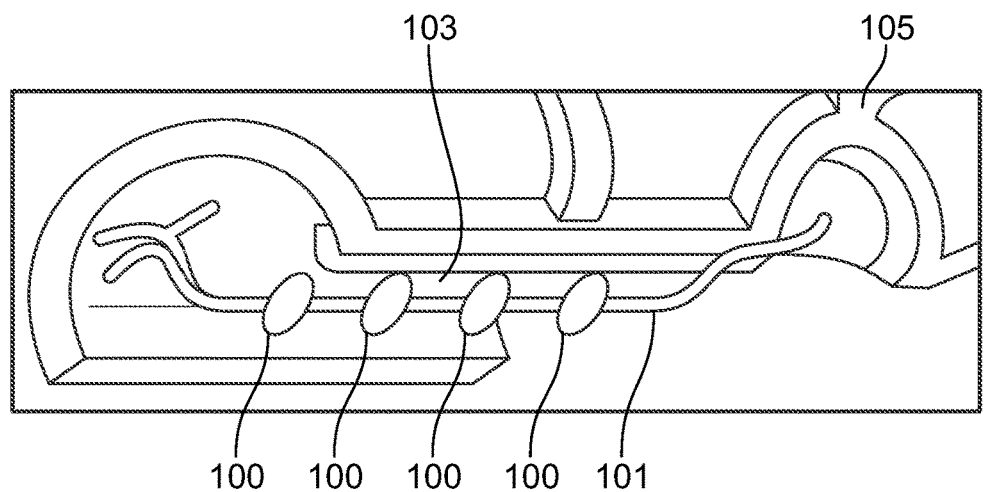
FIG. 2 illustrates a schematic diagram of a plurality of routing clip assemblies that securely connect a fuel and/or brake pipe to a frame of a vehicle, according to an embodiment of the present disclosure.

FIG. 2 illustrates a schematic diagram of a plurality of routing clip assemblies 100 that securely connect a fuel and/or brake pipe 101 to a frame 103 of a vehicle 105. The pipe 101 is an example of a tubular component that may be retained by the routing clip assemblies 100. An outside surface of the pipe 101 may be coated with plastic, for example, to protect the pipe 101 from damage. The routing clip assemblies 100 may be used with respect to various other applications other than shown. For example, the routing clip assemblies 100 may be used with respect to fluid-conveying components with respect to various other vehicles, fixed structures (such as plumbing within a building), and/or the like.

Figure 3:
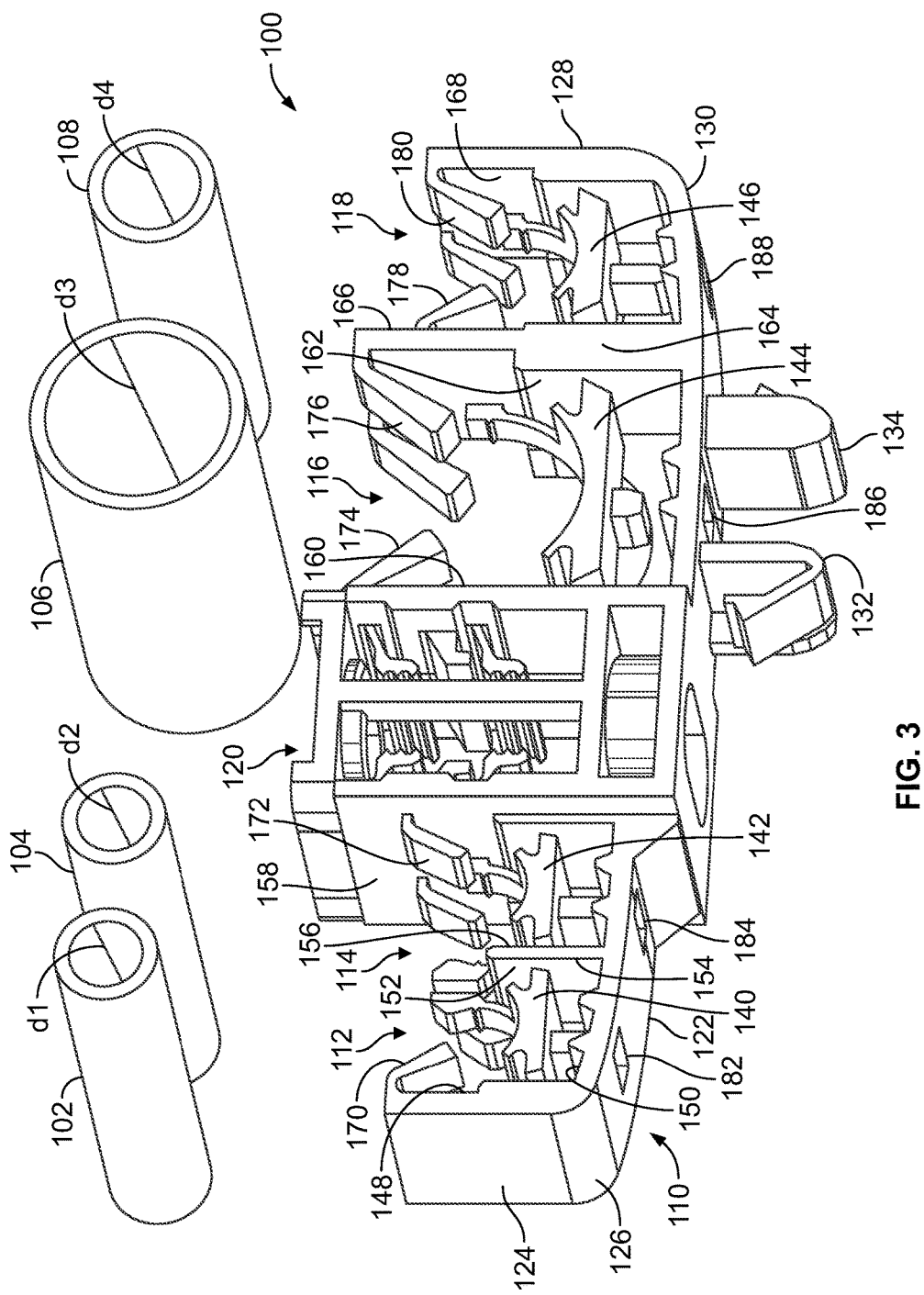
FIG. 3 illustrates a perspective front view of a routing clip assembly that is configured to securely retain a plurality of tubular components, according to an embodiment of the present disclosure.

FIG. 3 illustrates a perspective front view of a routing clip assembly 100 that is configured to securely retain a plurality of tubular components 102, 104, 106, and 108, according to an embodiment of the present disclosure. The tubular components 102, 104, 106, and 108 may be pipes, conduits, tubes, or the like. The diameter d1 of the tubular component 102 may be the same or different than the diameter d2 of the tubular component 104. The diameter d3 of the tubular component 106 may differ from the diameters d1 and d2. The diameter d4 of the tubular component 108 may differ from the diameters d1, d2, and d3.

The routing clip assembly 100 is configured to retain the tubular components 102, 104, 106, and 108, at least two of which may have different diameters. The routing clip assembly 100 may be configured to retain more or less tubular components than shown.

The routing clip assembly 100 may be formed of injection-molded plastic, for example. Alternatively, the routing clip assembly 100 may be formed of various other materials, such as rubber or other elastomeric materials, metal, or the like. Additionally, the routing clip assembly 100 may be integrally molded and formed as an integral single piece of injection molded plastic, for example, or the routing clip assembly 100 may be formed of more than one of the materials noted above.

The routing clip assembly 100 includes a housing 110 that includes tube retainers 112, 114, 116, and 118. The tube retainer 112 is configured to retain the tubular component 102. The tube retainer 114 is configured to retain the tubular component 104. The tube retainer 116 is configured to retain the tubular component 106. The tube retainer 118 is configured to retain the tubular component 108.

The routing clip assembly 100 may also include a stud retainer 120. As shown, the stud retainer 120 is positioned between the tube retainer 114 and the tube retainer 116. Optionally, the stud retainer may be located at various other areas of the housing 110. The stud retainer 120 is configured to receive and retain a fastener, such as a threaded stud, bolt, screw, or the like. The stud retainer 120 is configured to receive and securely retain the fastener, which may then be connected to a structure, such as a frame, panel, wall, ceiling, or the like. The stud retainer 120 may be similar to the stud retainers shown and described in United States Patent Application Publication No. 2006/0099049, filed Sep. 16, 2005, and United States Patent Application Publication No. 2009/0028668, filed May 7, 2008, both of which are hereby incorporated by reference in their entireties. Alternatively, the routing clip assembly 100 may not include the stud retainer 120.

The housing 110 includes a base 122 that supports each of the tube retainers 112, 114, 116, and 118, as well as the stud retainer 120. A lateral wall 124 extends upwardly from the base 122 at a first end 126, while an opposite lateral wall 128 extends upwardly from the base 122 at an opposite second end 130.

Opposed clips 132 and 134 extend downwardly from a portion of the base 122. The clips 132 and 134 are configured to cooperate to securely connect the routing clip assembly 100 into a receiving hole formed through a structure. The clips 132 and 134 may be located at various other portions of the housing 110 other than shown. Optionally, the housing 110 may include more clips than shown. Alternatively, the housing 110 may not include the clips 132 and 134.

The routing clip assembly 100 also includes tube-constraining inserts 140, 142, 144, and 146 positioned within the tube retainers 112, 114, 116, and 118, respectively. Because the tube-constraining inserts 140, 142, 144, and 146 are positioned within the tube retainers 112, 114, 116, and 118, respectively, the tube-constraining inserts 140, 142, 144, and 146 are considered to be inserted into internal chambers defined by the tube retainers 112, 114, 116, and 118, respectively, whether or not the tube-constraining inserts 140, 142, 144, and 146 are integrally molded and formed with the tube retainers 112, 114, 116, and 118. As explained below, the tube-constraining inserts 140, 142, 144, and 146 cooperate with the tube retainers 112, 114, 116, and 118 to axially and rotationally constrain the tubular components 102, 104, 106, and 108 within the tube retainers 112, 114, 116, and 118, respectively.

Figure 4:
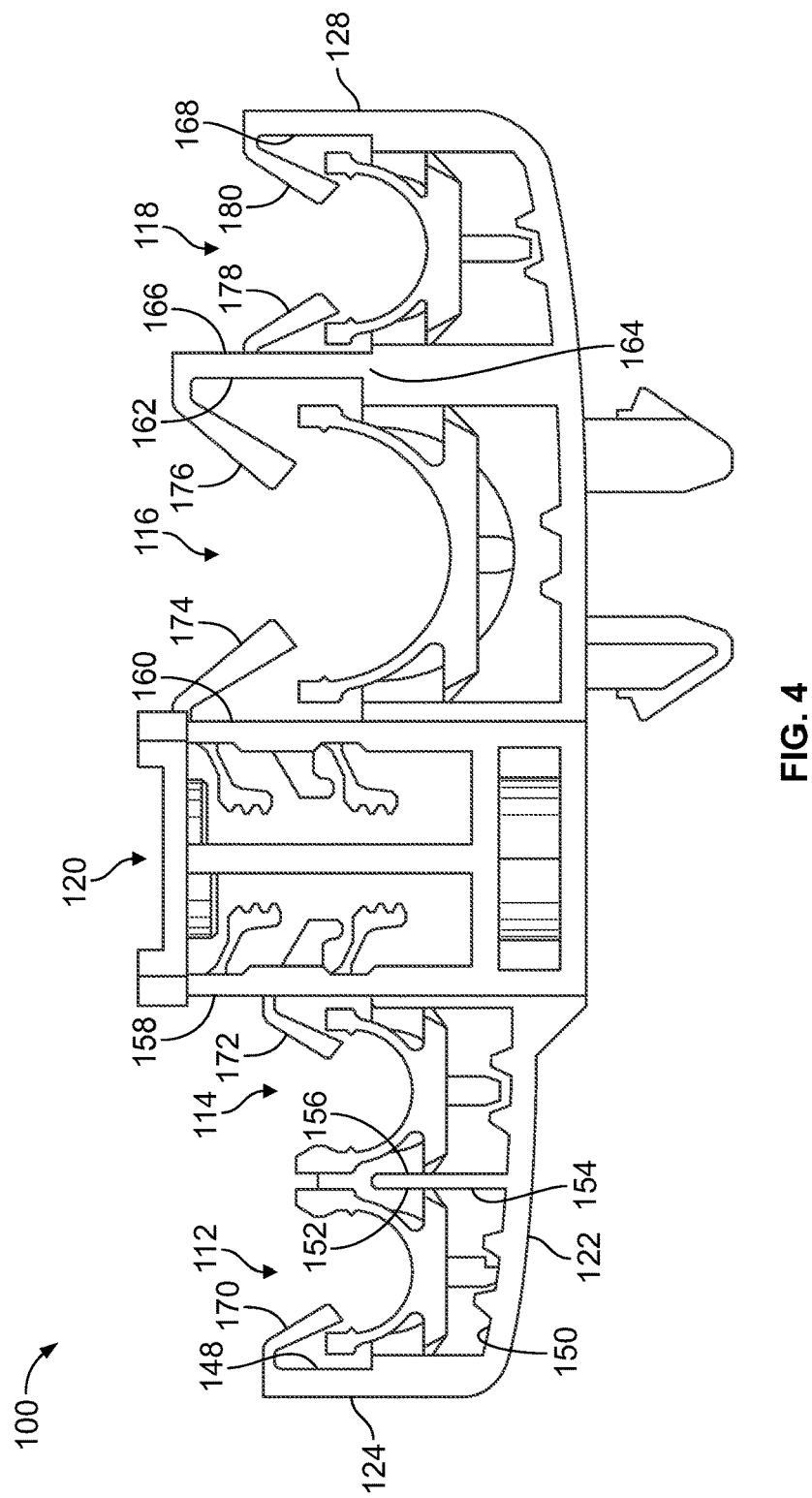
FIG. 4 illustrates a front view of a routing clip assembly, according to an embodiment of the present disclosure.

FIG. 4 illustrates a front view of the routing clip assembly 100, according to an embodiment of the present disclosure. Referring to FIGS. 3 and 4, the tube retainer 112 is formed between an interior surface 148 of the lateral wall 124, an upper surface 150 of the base 122, and an outboard surface 152 of a divider 154 extending upwardly from the upper surface 150 of the base 122. The tube retainer 114 is formed between an inboard surface 156 of the divider 154, the upper surface 150 of the base 152, and an outer wall 158 of the stud retainer 120. The tube retainer 116 is formed between an opposite outer wall 160 of the stud retainer 120, the upper surface 150 of the base 122, and an inboard surface 162 of a divider 164 extending upwardly from the upper surface 150. The tube retainer 118 is formed between an outboard surface 166 of the divider 164, the upper surface 150 of the base 122, and an interior surface 168 of the lateral wall 128.

Constraining prongs 170 may extend inwardly and downwardly from an upper edge of the lateral wall 124 into the tube retainer 112. Constraining prongs 172 may extend inwardly and downwardly from the outer wall 158 of the stud retainer 120 into the tube retainer 114. Constraining prongs 174 may extend inwardly and downwardly from the outer wall 160 of the stud retainer 120 into the tube retainer 116. Constraining prongs 176 may extend inwardly and downwardly from an upper edge of the divider 164 into the tube retainer 116. Constraining prongs 178 may extend inwardly and downwardly from the divider 164 into the tube retainer 118. Constraining prongs 180 may extend inwardly and downwardly from an upper edge of the lateral wall 128 into the tube retainer 118. More or less constraining prongs than shown may extend into each tube retainer 112, 114, 116, and 118. In at least one other embodiment, one or more of the tube retainers 112, 114, 116, and 118 may be devoid of constraining prongs extending therein.

As shown in FIG. 3, insert-locking channels 182, 184, 186, and 188 may be formed through the base 122 underneath the tube retainers 112, 114, 116, and 118, respectively. As described below, the insert-locking channels 182, 184, 186, and 188 are configured to receive and retain a protuberance extending from the tube-constraining inserts 142, 144, 146, and 148, respectively, to lock the tube-constraining inserts 142, 144, 146, and 148 in position within the tube retainers 112, 114, 116, and 118, respectively.

Figure 5:
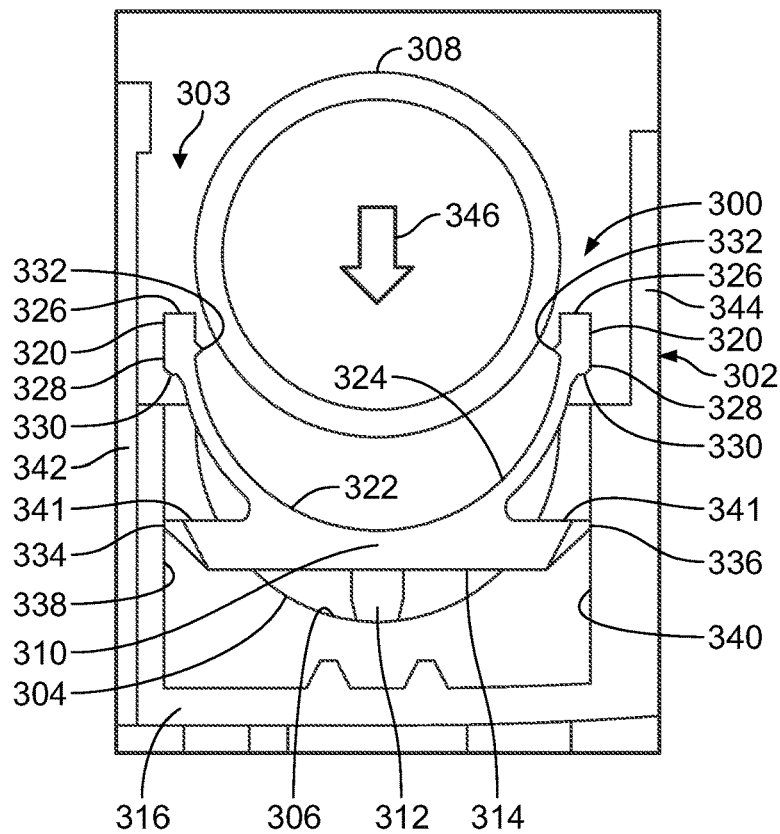
FIG. 5 illustrates a front view of tube-constraining insert within a tube retainer, according to an embodiment of the present disclosure.

FIG. 5 illustrates a front view of tube-constraining insert 300 within a tube retainer 302, according to an embodiment of the present disclosure. As shown in FIG. 5, the tube-constraining insert 300 is in an initial position (temporarily secured) with respect to the tube retainer 302. The tube-constraining insert 300 is an example of any of the tube-constraining inserts 142, 144, 146, or 148 (shown in FIGS. 3 and 4). It is to be understood that the tube-constraining inserts 142, 144, 146, or 148 may be sized and shaped differently than the tube-constraining insert 300. The tube retainer 302 is an example of any of the tube retainers 112, 114, 116, or 118 (shown in FIGS. 3 and 4). It is to be understood that the tube retainers 112, 114, 116, or 118 may be sized and shaped differently than the tube retainer 302. For the sake of clarity, constraining prongs (such as the constraining prongs 170 shown in FIGS. 3 and 4) are not shown in FIG. 5.

As shown, the tube retainer 302 defines an internal chamber 303 in which the tube-constraining insert 300 is positioned. The internal chamber 303 may be defined between an upper surface of a base 316 and interior surfaces of walls 342 and 344. The tube-constraining insert 300 is positioned within the internal chamber 303 at an initial position, as shown. As explained below, the tubular component 308 is urged into the tube-constraining insert 300. The tubular component 308 continues to be urged downwardly, which then drives the tube-constraining insert 300 into a final, secure position in which the tube-constraining insert 300 and the tube retainer 302 cooperate to axially and radially constrain the tubular component 308. For example, the tube-constraining insert 300 and the tube retainer 302 cooperate to prevent the tubular component from axially or radially shifting within a tube-constraining channel 324 of the tube-constraining insert 300.

The tube retainer 302 (and therefore any or all of the tube retainers 112, 114, 116, and 118) may include a wall rim 304 at one or both ends. The wall rim 304 includes a semicircular channel 306 that is sized and shaped to accommodate the shape of a tubular component 308. The tubular component 308 is an example of any of the tubular components 102, 104, 106, or 108 (shown in FIG. 3). It is to be understood that the tubular components 102, 104, 106, or 108 may be sized and shaped differently than the tubular component 308.

The tube-constraining insert 300 includes the support base 310. A protuberance 312 extends downwardly from a lower surface 314 of the support base 310. The protuberance 312 may be a barb, post, stud, clasp, snap, nub, or the like that is configured to be received and retained within an insert-locking channel (hidden from view) formed through a base 316 of the tube retainer 302.

Opposed arcuate constraining arms 320 radially and upwardly extend from an upper surface 322 of the of the support base 310. The semi-tubular tube-constraining channel 324 (open at an upper end) is defined between interior surfaces of the constraining arms 320 and the upper surface 322 of the support base 310.

Free ends 326 of the constraining arms 320 may include expanded heads 328 having exposed lower lateral ramps 330. Barbs 332 inwardly extend from the heads 328 into the channel 324.

Opposite sides 334 and 336 of the support base 310 connect to interior surfaces 338 and 340 of the opposed walls 342 and 344, respectively, of the tube retainer 302. The support base 310 may be integrally molded and formed with the tube retainer 302, such that the sides 334 connect to the surfaces 338 and 340 through flash connections 341, for example. In at least one other embodiment, the tube-constraining insert 300 may be formed separately from the tube retainer 302.

As shown in FIG. 5, the tube-constraining insert 300 is temporarily connected (at the initial position) to the tube retainer 302 within the internal chamber 303 by the flash connections 341. The flash connections 341 are configured to break when the tube-constraining insert 300 is driven into a final position within the internal chamber 303. In order to securely constrain the tubular component 308 in the tube retainer 302, the tubular component 308 is urged towards and into the channel 324 in the direction of arrow 346.

Figure 6:
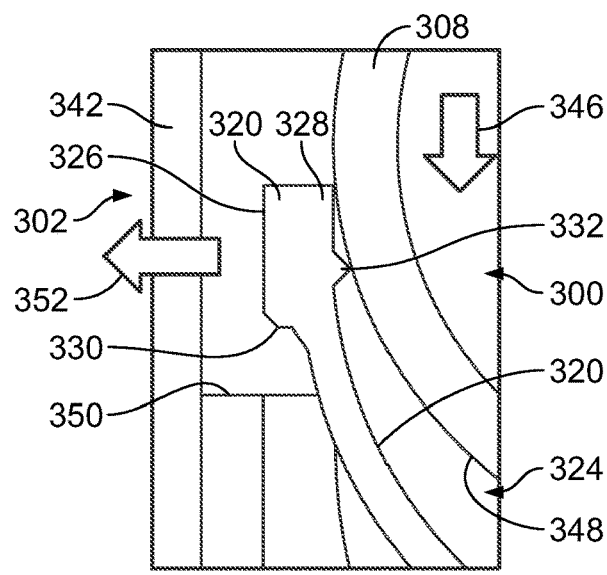
FIG. 6 illustrates a partial front view of a tubular component initially contacting a channel of a tube-constraining insert positioned within a tube retainer, according to an embodiment of the present disclosure.

FIG. 6 illustrates a partial front view of the tubular component 308 initially contacting the channel 324 of the tube-constraining insert 300 positioned within the tube retainer 302. As shown, an outer surface 348 of the tubular component 308 slides over the interior surfaces of the expanded heads 328 of the constraining arms 320. Notably, in the initial position, the heads 328 are spaced apart and above ledges 350 of the walls 342 and 344 (wall 344 not shown in FIG. 6). As such, as the tubular component 308 continues to be urged into the channel 324 in the direction of arrow 346, the constraining arms 320 flex outwardly in the direction of arrow 352 such that the heads 328 outwardly flex, thereby providing sufficient internal space to receive the tubular component 308.

Figure 7:
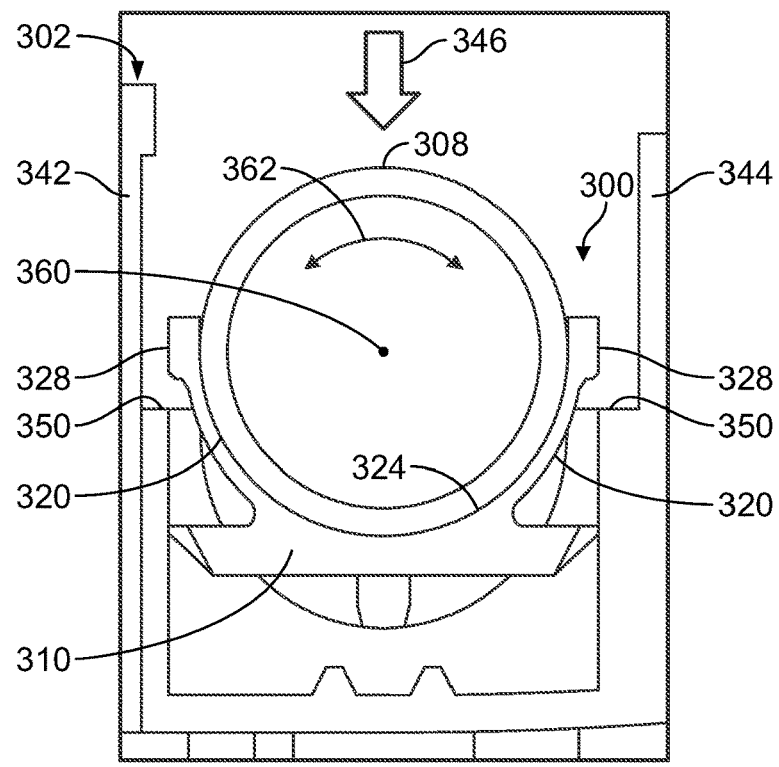
FIG. 7 illustrates a front view of a tubular component supported within a channel of a tube-constraining insert positioned within a tube retainer, according to an embodiment of the present disclosure.

FIG. 7 illustrates a front view of the tubular component 308 supported within the channel 324 of the tube-constraining insert 300 positioned within the tube retainer 302. With continued urging of the tubular component 308 into the channel 324 in the direction of arrow 346, the tubular component 308 fully seats on the tube-constraining insert 300 within the channel 324. The constraining arms 320 exert a constraining force (for example, a squeezing force that prevents or otherwise reduces both axial and radial movement) into the tubular component 308. The barbs 332, which include a pointed or sharp edge, dig into the outer surface of the tubular component 308, thereby axially and radially constraining the tubular component 308 therein. Once the tubular component 308 fully seats within the channel 324 of the tube-constraining insert 300, the tubular component 308 is constrained from axially shifting therein in directions parallel to a longitudinal axis 360 of the tubular component 308, or radially shifting within the channel 324 in rotational directions 362 about the longitudinal axis 360.

After or as the tubular component 308 is fully seated into the channel 324 of the tube-constraining insert 300, the tubular component 308 is further urged in the direction of arrow 346, in order to securely couple the tube-constraining insert 300 to the tube retainer 302. As the tubular component 308 is further urged in the direction of arrow 346, the tubular component forces the tube-constraining insert 300 in the same direction. The continued driving force exerted into the tubular component 308 breaks any flash connections between the support base 310 and the tube retainer 302.

Figure 8:
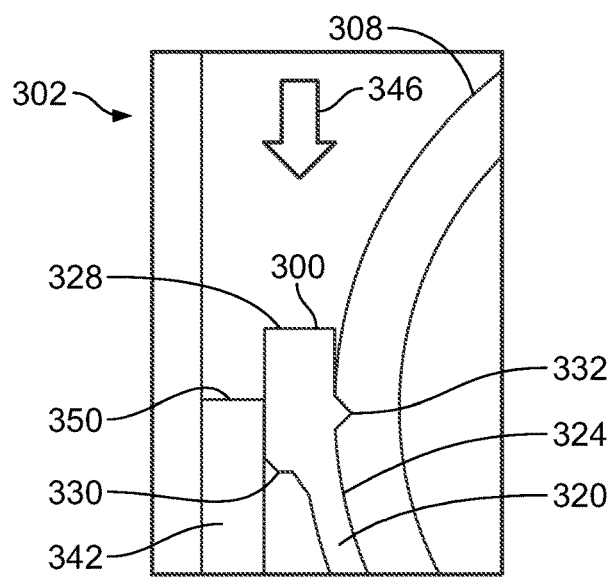
FIG. 8 illustrates a partial front view of a tube-constraining insert being driven into a tube retainer by a tubular component, according to an embodiment of the present disclosure.

FIG. 8 illustrates a partial front view of the tube-constraining insert 300 being driven into the tube retainer 302 by the tubular component 308, according to an embodiment of the present disclosure. As the tubular component 308 continues to be driven in the direction of arrow 346, the flash connections between the tube-constraining insert 300 and the tube retainer 302 are broken, thereby allowing the tube-constraining insert 300 to be driven in the direction of arrow 346. During this movement, the ramps 330 (which may angle downwardly from an outboard side to an inboard side) slide over upper surfaces of the ledges 350 of the walls 342 and 344 (wall 344 not shown in FIG. 8). The stationary walls 342 and 344 act to further squeeze the constraining arms 320 into the outer surface of the tubular component 308 as the tube-constraining insert 300 continues to be driven downwardly in the direction of arrow 346. Accordingly, the continued squeezing of the tube-constraining insert 300 into the tubular component 308 increases the constraining force both in the axial and radial directions of the tubular component 308. For example, as the motion of the tube-constraining insert 300 causes the constraining arms 320 to further squeeze the tubular component, the barbs 332 dig deeper into an outer surface of the tubular component 308, thereby providing a more robust constraining force.

As noted, before the constraining arms 320 encounter the rigid walls 342 and 344 of the tube retainer 302, the constraining arms 320 may outwardly deflect as the tubular component 308 is urged into the channel 324. With continued movement in the direction of arrow 346, the constraining arms 320 move onto the rigid walls 342 and 344. During such movement, the rigid walls 342 and 344 of the tube insert 302 force the constraining arms 320 to inwardly deflect (for example, the rigid walls 342 and 344 squeeze the opposed constraining arms 320 towards one another) into and around portions of the tubular component 308, thereby causing the barbs 332 to further dig into the outer surface of the tubular component 308.

Optionally, the tube-constraining insert 300 may not include the barbs 332. Instead, the squeezing force exerted by the constraining arms 320 into the tubular component 308 may be sufficient to axially and radially constrain the tubular component 308 within the channel 324.

Figure 9:
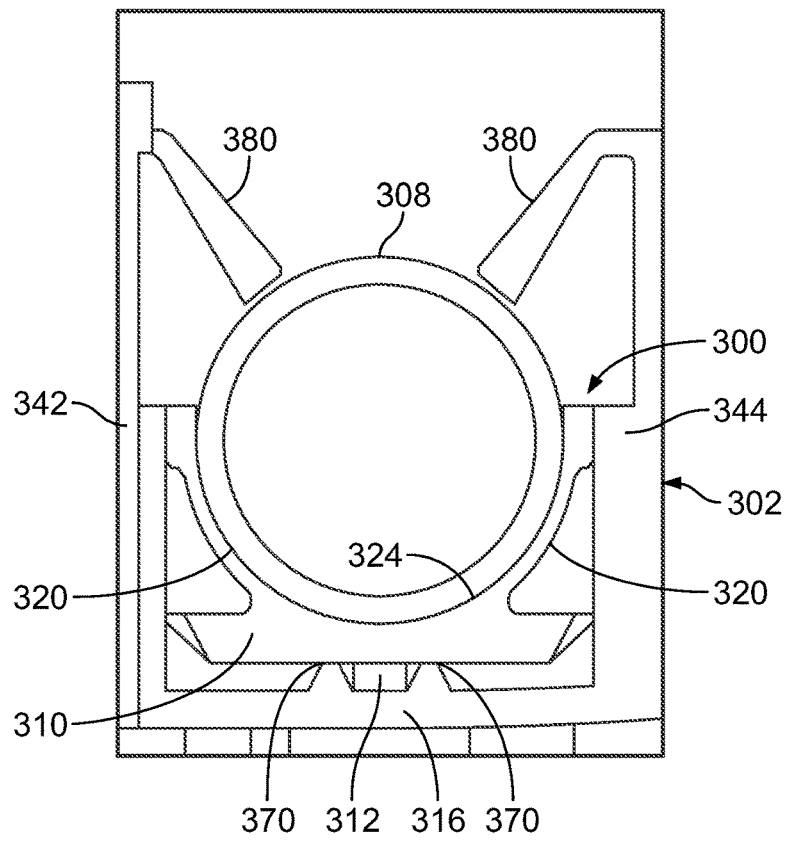
FIG. 9 illustrates a front view of a tube-constraining insert fully seated within a tube retainer and axially and radially constraining a tubular component, according to an embodiment of the present disclosure.

FIG. 9 illustrates a front view of a tube-constraining insert 300 fully seated within the tube retainer 302 and axially and radially constraining the tubular component 308, according to an embodiment of the present disclosure. As shown in FIG. 9, the tube-constraining insert 300 is in a final (fully secured) position with respect to the tube retainer 302. The constraining arms 320 of the tube-constraining insert 300 squeeze or otherwise compress the tubular component 308 therebetween. The walls 342 and 344 of the tube retainer 302 exert a squeezing or compressing force into the constraining arms 320, which increases the constraining force exerted by the constraining arms 320 into the tubular component 308.

Figure 10:
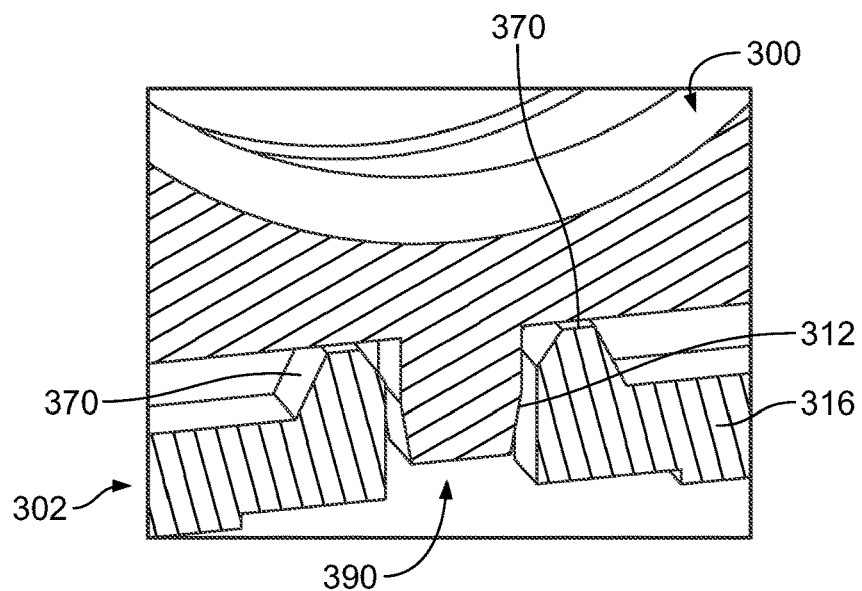
FIG. 10 illustrates a perspective front view of a protuberance of a tube-constraining insert being retained within an insert-locking channel formed through a base of a tube retainer, according to an embodiment of the present disclosure.

FIG. 10 illustrates a perspective front view of the protuberance 312 of the tube-constraining insert 300 being retained within an insert-locking channel 390 formed through the base 316 of the tube retainer 302, according to an embodiment of the present disclosure. Referring to FIGS. 9 and 10, in the fully seated position, the protuberance 312 downwardly extending from the support base 310 is received and retained within the insert-locking channel 390 formed through the base 316 of the tube retainer 302. The protuberance 312 is trapped within the insert-locking channel 390. As such, the tube-constraining insert 300 is prevented from shifting with respect to the tube retainer 302. Because the tube-constraining insert 300 constrains (both axially and radially) the tubular component 308, the tube-constraining insert 300 locking in place with respect to the tube retainer 302 (such as through the protuberance 312 being retained within the insert-locking channel 390) ensures that the tubular component 308 does not axially or radially shift with respect to the tube retainer 302.

Support ribs 370 positioned above and on either side of the insert-locking channel may upwardly extend from the base 316 and guide the protuberance 312 into the insert-locking channel. The support ribs 370 may also conform to a shape of the protuberance 312 to provide additional securing force. Alternatively, the tube retainer 302 may not include the support ribs 370. Also, alternatively, the tube retainer 302 may not include the insert-locking channel 390.

Additionally, in the fully-seated position, one or more constraining prongs 380 may abut into an outer surface of the tubular component 308 opposite from the tube-constraining insert 300. The prongs 380 exert a resistive force into the tubular component 308. As shown in FIG. 9, the constraining prongs 380 exert a constraining or other such resistive force into a top portion of the tubular component 308, while the tube-constraining insert 300, which cradles the tubular component 308 therein, exerts a constraining or other such resistive force into a bottom portion of the tubular component 308. Alternatively, the tube retainer 302 may not include the constraining prongs 380.

As described above, embodiments of the present disclosure provide tube-retaining clip assemblies that are is able to effectively resist axial and radial forces exerted by, into, and/or on a tubular component coupled to the routing clip assembly. Certain embodiments of the present disclosure provide a clip assembly that includes a tube-constraining insert having one or more barbs that prevent rotation of a tubular component, but does not affect (or minimally affects) an insertion force of the tubular component therein. The tube-constraining insert is configured to be urged into a secure engagement with a tube retainer. The barb(s) engages (for example, bites or digs into) an outside surface of the tubular component as the tubular component is installed into the tube retainer. The barb(s) may be located within and/or above a retaining channel of the tube-constraining insert. The barb(s) may connect to the retaining channel through a flash connection that is broken as the tube-constraining insert is urged into a secure connection with the tube retainer. As such the entire clip assembly may be formed as an integral piece of plastic (such as a single piece of injection-molded plastic).

It is to be understood that use of numeric indicators, such as "first," "second," "third," and "fourth," is merely to indicate a number of a particular component, structure, feature, and/or the like. For example, use of "first" and "second," may be reversed, such that a first component is a second component.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A routing clip assembly configured to securely retain a tubular component, the routing clip assembly comprising:
a tube-constraining insert including a support base and opposed constraining arms extending from a first surface of the support base, wherein a tube-constraining channel is defined between the opposed constraining arms and the support base, wherein the constraining arms are configured to axially and radially constrain the tubular component; and
a tube retainer,
wherein the tube-constraining insert is connected to the tube retainer by at least one flash connection, and
wherein each of the opposed constraining arms comprises a free end having an expanded head, wherein the expanded head includes a lateral ramp that is configured to slide over a portion of a wall of a tube retainer.

2. The routing clip assembly of claim 1, wherein the tube retainer defines an internal chamber, and wherein the tube-constraining insert is positioned within the internal chamber.

3. The routing clip assembly of claim 2, wherein the tube-constraining insert is temporarily connected to the tube retainer within the internal chamber by the least one flash connection, and wherein the at least one flash connection is configured to break when the tube-constraining insert is driven into a final position within the internal chamber.

4. The routing clip assembly of claim 2, wherein the tube retainer comprises a base and walls upstanding from the base, wherein the internal chamber is defined between the base and the walls, and wherein the walls are configured to squeeze the opposed constraining arms towards one another when the tube-constraining insert is driven from an initial position to a final position within the internal chamber.

5. The routing clip assembly of claim 2, wherein the tube-constraining insert comprises a protuberance extending from a second surface of the support base that is opposite from the first surface, wherein the tube retainer comprises an insert-locking channel formed through a base, and wherein the protuberance is configured to be received and retained by the insert-locking channel to lock the tube-constraining insert in position with respect to the tube retainer.

6. The routing clip assembly of claim 5, wherein the tube retainer further comprises support ribs extending from the base on either side of the insert-locking channel, wherein the support ribs are configured to guide the protuberance into the insert-locking channel.

7. The routing clip assembly of claim 2, wherein the tube retainer comprises one or more constraining prongs that are configured to abut into an outer surface of the tubular component opposite from the tube-constraining insert.

8. The routing clip assembly of claim 1, wherein at least one of the opposed constraining arms comprises an inwardly-directed barb extending from an interior surface, wherein the barb is configured to dig into an outer surface of the tubular component.

9. A routing clip assembly configured to securely retain a plurality of tubular components, the routing clip assembly comprising:
a plurality of tube-constraining inserts, wherein each of the plurality of tube-constraining inserts includes a support base and opposed constraining arms extending from a first surface of the support base, wherein a tube-constraining channel is defined between the opposed constraining arms and the support base, wherein the constraining arms are configured to axially and radially constrain one of the tubular components; and a plurality of tube retainers, wherein each of the plurality of tube retainers defines an internal chamber, and wherein each of the plurality of tube-constraining inserts is positioned within an internal chamber of a respective one of the plurality tube retainers and connected thereto by a flash connection.

10. The routing clip assembly of claim 9, wherein the at least one flash connection is configured to break when the tube-constraining insert is driven into a final position within the internal chamber.

11. The routing clip assembly of claim 9, wherein each of the plurality of tube retainers comprises a base and walls upstanding from the base, wherein the internal chamber is defined between the base and the walls, and wherein the walls are configured to squeeze the opposed constraining arms towards one another when the tube-constraining insert is driven from an initial position to a final position within the internal chamber.

12. The routing clip assembly of claim 11, wherein at least one of the opposed constraining arms comprises an inwardly-directed barb extending from an interior surface, wherein the barb is configured to dig into an outer surface of one of the tubular components.

13. The routing clip assembly of claim 9, wherein each of the tube-constraining inserts comprises a protuberance extending from a second surface of the support base that is opposite form the first surface, wherein each of the plurality of tube retainers comprises an insert-locking channel formed through a base, and wherein the protuberance is configured to be received and retained by the insert-locking channel to lock the tube-constraining insert in position with respect to the tube retainer.

14. The routing clip assembly of claim 13, wherein each of the plurality of tube retainers further comprises support ribs extending from the base on either side of the insert-locking channel, wherein the support ribs are configured to guide the protuberance into the insert-locking channel.

15. The routing clip assembly of claim 9, wherein each of the tube retainers comprises one or more constraining prongs that are configured to abut into an outer surface of one of the tubular components opposite from the tube-constraining insert.

16. The routing clip assembly of claim 9, wherein each of the opposed constraining arms comprises a free end having an expanded head, wherein the expanded head includes a lateral ramp that is configured to slide over a portion of a wall of one of the plurality of tube retainers.

17. A routing clip assembly configured to securely retain a tubular component, the routing clip assembly comprising:
(a) a tube-constraining insert including:
  a support base;
  opposed constraining arms extending from a first surface of the support base, wherein at least one or the opposed constraining arms comprises an inwardly-directed barb extending from an interior surface, wherein the barb is configured to dig into an outer surface of the tubular component, wherein tube-constraining channel is defined between the opposed constraining arms and the support base, wherein the constraining arms are configured to axially and radially constrain the tubular component; and
  a protuberance extending from a second surface of the support base that is opposite from the first surface;
(b) a tube retainer including:
  a base;
  walls upstanding from the base, wherein an internal chamber is defined between the base and the walls, wherein the tube-constraining insert is positioned within the internal chamber;
  one or more constraining prongs that are configured to abut into an outer surface of the tubular component opposite from the tube-constraining insert; and
  an insert-locking channel formed through the base,
wherein the tube-constraining insert is temporarily connected to the tube retainer at an initial position within the internal chamber by at least one flash connection, and wherein the at least one flash connection is configured to break when the tube-constraining insert is driven into a final position within the internal chamber,
wherein the walls are configured to squeeze the opposed constraining arms towards one another when the tube-constraining insert is driven from the initial position to the final position within the internal chamber, and
wherein the protuberance is configured to be received and retained by the insert-locking channel to lock the tube-constraining insert in position with respect to the tube retainer in the final position.

18. The routing clip assembly of claim 17, wherein the tube retainer further comprises support ribs extending from the base on either side of the insert-locking channel, wherein the support ribs are configured to guide the protuberance into the insert-locking channel.

19. The routing clip assembly of claim 17, wherein each of the opposed constraining arms comprises a free end having an expanded head, wherein the expanded head includes a lateral ramp that is configured to slide over a portion of one of the walls of the tube retainer.

* * * * *